(12) United States Patent
Magerramov et al.

(10) Patent No.: US 10,545,667 B1
(45) Date of Patent: Jan. 28, 2020

(54) DYNAMIC DATA PARTITIONING FOR STATELESS REQUEST ROUTING

(71) Applicant: Amazon Technologies, Inc., Seattle, WA (US)

(72) Inventors: Joseph E Magerramov, Bellevue, WA (US); Moosa Muhammad, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 396 days.

(21) Appl. No.: 14/638,821

(22) Filed: Mar. 4, 2015

(51) Int. Cl.
*G06F 3/06* (2006.01)

(52) U.S. Cl.
CPC ............ *G06F 3/0607* (2013.01); *G06F 3/067* (2013.01); *G06F 3/0631* (2013.01); *G06F 3/0644* (2013.01)

(58) Field of Classification Search
CPC .... G06F 3/0607; G06F 3/0631; G06F 3/0644; G06F 3/067
USPC .......................................................... 710/74
See application file for complete search history.

(56) References Cited

U.S. PATENT DOCUMENTS

| | | | |
|---|---|---|---|
| 6,370,584 B1 | 4/2002 | Bestavros et al. | |
| 7,127,514 B2 | 10/2006 | Hunt | |
| 7,606,252 B2 | 10/2009 | Man-Hak Tso et al. | |
| 7,783,763 B2 | 8/2010 | Tuel | |
| 7,937,436 B2 | 5/2011 | Matthews et al. | |
| 8,134,916 B2 | 3/2012 | Achlioptas et al. | |
| 8,429,162 B1 * | 4/2013 | Wang | G06F 16/278 707/737 |
| 8,539,197 B1 * | 9/2013 | Marshall | G06F 13/00 711/112 |
| 8,601,000 B1 * | 12/2013 | Stefani | G06F 17/30002 707/747 |
| 8,850,002 B1 | 9/2014 | Dickinson et al. | |
| 8,935,493 B1 * | 1/2015 | Dolan | G06F 3/0649 711/117 |
| 9,497,123 B2 * | 11/2016 | Basavaraja | H04L 45/745 |
| 2003/0079027 A1 | 4/2003 | Slocombe et al. | |
| 2007/0022121 A1 * | 1/2007 | Bahar | G06F 9/5011 |

(Continued)

OTHER PUBLICATIONS

U.S. Appl. No. 15/815,664, filed Nov. 16, 2017, Marc John Brooker.

*Primary Examiner* — Idriss N Alrobaye
*Assistant Examiner* — Brooke J Taylor
(74) *Attorney, Agent, or Firm* — Robert C. Kowert; Kowert, Hood, Munyon, Rankin & Goetzel, P.C.

(57) ABSTRACT

Dynamic data partitioning for stateless request routing may be implemented. Respective partitions of data and corresponding mapping information may be maintained at partition hosts. A repartitioning event may be detected for the data to move a portion of data from a source partition host to a destination partition host. In response, the mapping information at the source partition host may be updated to indicate that the portion of data is located at the destination partition host for subsequent access requests received at the source partition host. The portion of the data may be copied from the source partition host to the destination partition host. Upon completion of the copy of the portion of the data, the mapping information at the destination partition host may be updated to indicate that the portion of the data is located at the destination partition host and is available for access.

20 Claims, 10 Drawing Sheets

(56) References Cited

U.S. PATENT DOCUMENTS

| | | | |
|---|---|---|---|
| 2009/0144284 A1* | 6/2009 | Chatley | G06F 3/0613 |
| 2012/0233522 A1* | 9/2012 | Barton | H04L 67/06 |
| | | | 714/758 |
| 2014/0297888 A1 | 10/2014 | McCann | |

* cited by examiner

DYNAMIC DATA PARTITIONING FOR STATELESS REQUEST ROUTING

BACKGROUND

Distributed systems have created great opportunities for implementing more efficient and available system architectures. Systems may no longer be limited by the capabilities of an individual computing system, but may instead share the workload for performing complex computing tasks, maintaining and storing data, or implementing various applications or services among multiple different computer systems. For example, in some distributed systems respective partitions or versions of data may be maintained among a collection of different systems in order to provide greater reliability and availability in the face of individual system failures.

The ability to leverage the capabilities of multiple different systems, however, can increase the complexity of ensuring that common data or other information maintained or shared among multiple systems is consistent. If, as in the previous example, different partitions of data are maintained in different locations, a change to the location of data from one partition to another may precipitate costly operations to make the various request routing systems that provide access to the partitions of the data aware of the change in location. As the need to automatically or dynamically partition data grows, consistency schemes to account for these failure scenarios when making changes to common data or other information maintained or shared may prove challenging to design or implement.

Figure 1A:
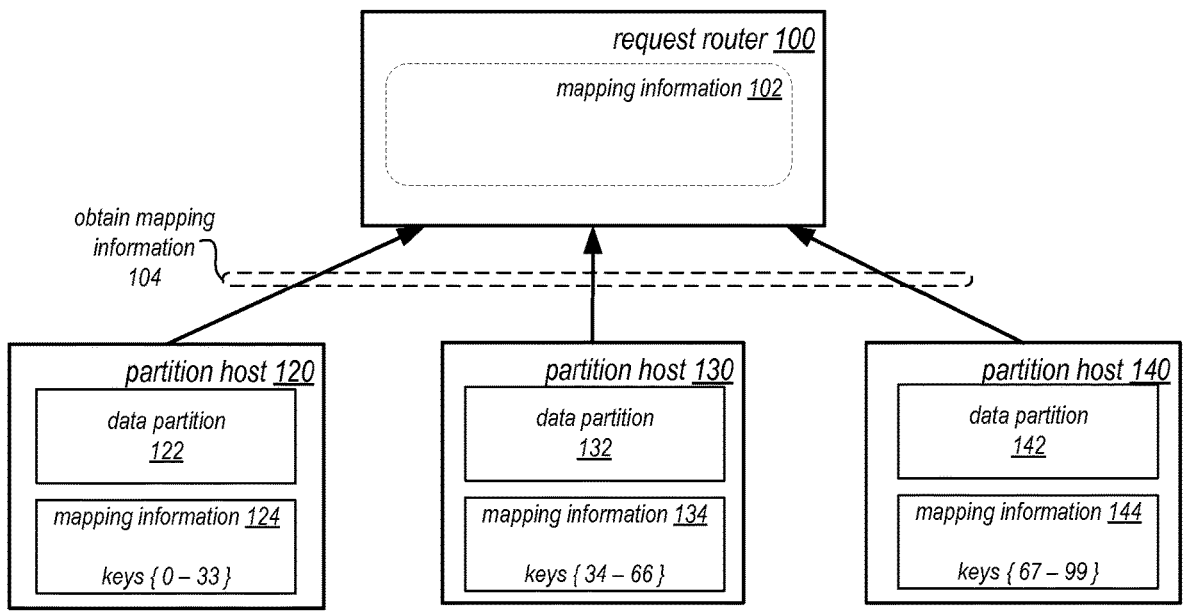
FIGS. 1A-1H are a series of block diagrams illustrating dynamic data partitioning for stateless request routing, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. The circuitry that forms the structure corresponding to "configured to" may include hardware circuits. In some contexts, the structure may be implemented as part of a general purpose computing device that is programmed to perform the task or tasks according to programming instructions.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f), interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of dynamic data partitioning for stateless request routing are described herein. Access to partitioned data across multiple partition hosts that maintain data partitions may be implemented via one or more request routers. In order to direct access requests to the appropriate partition host for an access request, a request router may need to understand the locations of different data partitions (as well as rules that govern mapping of each request to a specific partition).

Typically, such mapping is accomplished by examining a well-defined property of each request (usually referred to as partition or sharding key), and applying a deterministic transformation to it to arrive at the appropriate data partition. For instance, a partition key may be hashed, and then modded into one of the available data partitions. Such an approach may be stateless, as no mapping information may need to be maintained. However, distributed systems commonly rearrange or redistribute data amongst partition hosts (e.g., to alleviate performance stress or other optimizations). As data is located deterministically, a single change or movement of data may result in the movement of several portions of data to fit a new deterministic model that accommodates the original data move. Alternatively, global persistent mapping information may be maintained for request routers, that maps individual partition keys (or ranges of keys) with specific partitions. Yet, this global persistent mapping information (i.e., state-based routing) may need to be consistently maintained (as a result of changes to the location of data among partition hosts) so that multiple request routers may consistently direct requests to the same locations.

Dynamic data partitioning for stateless request routing may be implemented to provide low cost repartitioning (e.g., movement of data across partitions) and avoid the need to maintain a globally consistent shared state for request routers. Each data partition may also maintain mapping information to indicate the corresponding data maintained as part of the data partition. Initial partitioning assignments of data to partition hosts may be done manually by an operator, when a new partition comes online, or may be automated according to various tools or schemes to distribute data equally (e.g., a hashing scheme). Request routers may have access to a bootstrap list of all available partitions maintaining data. Request routers may then obtain mapping information from partition hosts as needed in order to direct access requests to data partitions. The mapping information of a request router need not be consistent with current locations of data among partition hosts as request routers may discover changes to mapping information as needed.

Figure 1B:
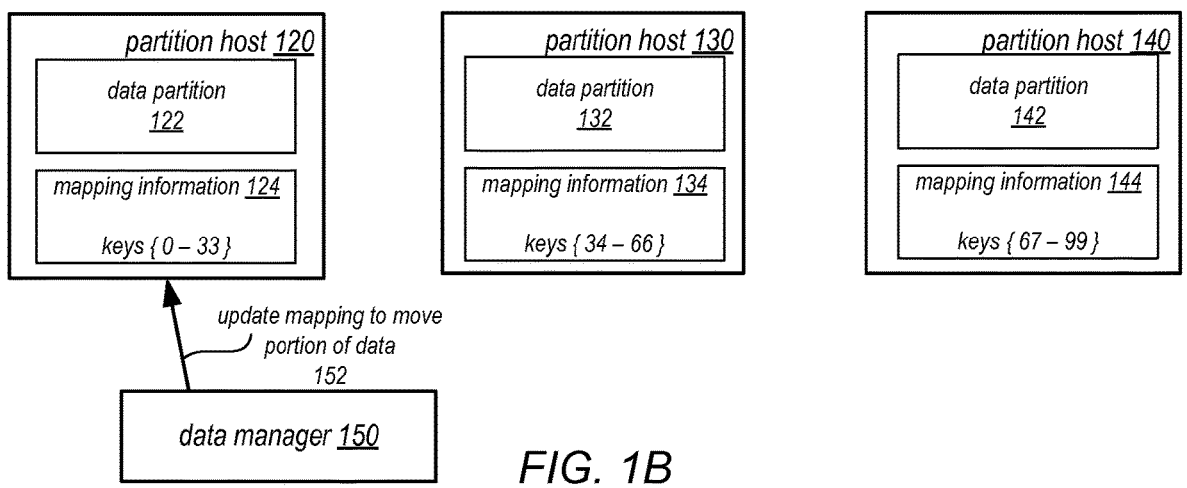
Figure 1B:
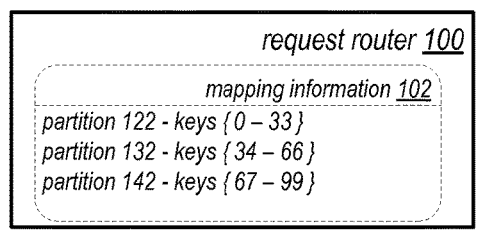
Figure 1C:
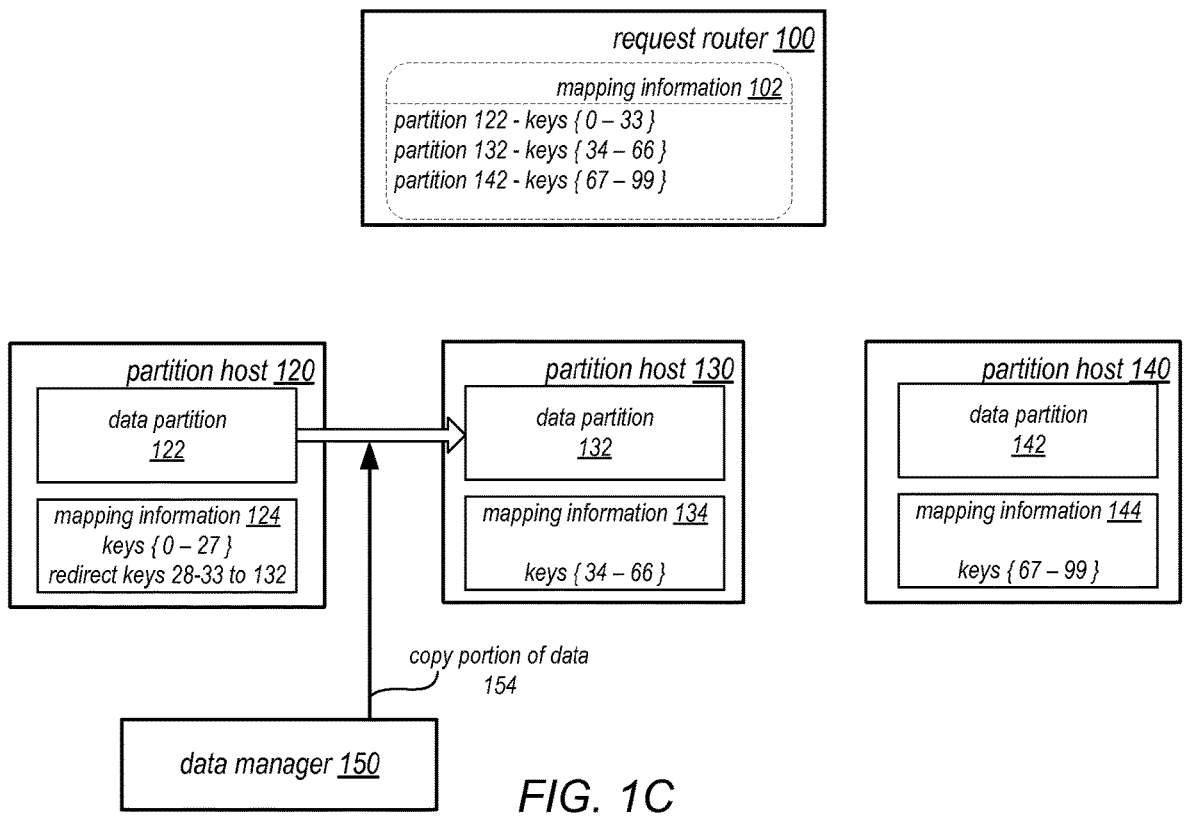

FIGS. 1A-1H are a series of block diagrams illustrating dynamic data partitioning for stateless request routing, according to some embodiments. As illustrated in FIG. 1A, request router 100 may be stateless, with no persistently maintained mapping information 102 (e.g., upon startup). Request routers may obtain mapping information 104 from partition hosts 120, 130, and 140, each of which maintain respective mapping information 124, 124, and 144 describing the data in the data partitions 122, 132, and 142. For example, partition key values may be described, such as key ranges 0-33, 34-66, and 67-99. As illustrated in FIG. 1B, request router now has mapping information 102 obtained from the partition hosts 120, 130, and 140, which describe partition keys corresponding to the respective data partitions 122, 132, and 142. Although not illustrated, in at least some embodiments, some partition keys and corresponding data may be maintained at multiple partition hosts.

Figure 1D:
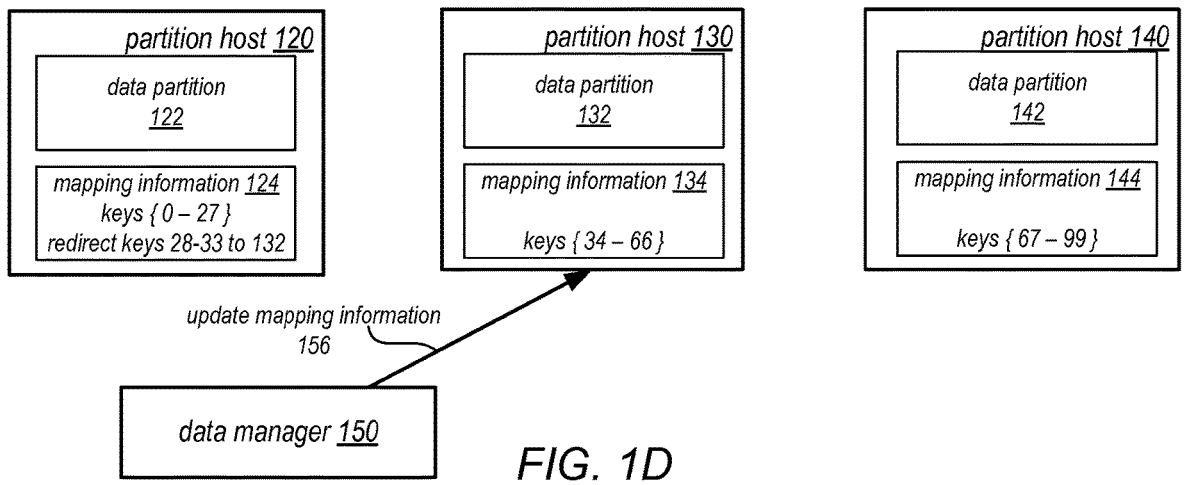

A repartitioning event may be an event that triggers or causes the movement of data from one partition to another. Repartitioning events may be automatically/dynamically determined, or detected as the result of a manual request to move data. The repartitioning event may trigger the movement of a portion of data from one data partition to another. For example, as illustrated in FIG. 1B, the mapping information may be updated 152 to move a portion of data by data manager 150. Data manager 150 may, in various embodiments, perform the techniques described below with regard to FIGS. 3-5 to perform dynamic data partitioning for stateless request routing. In FIG. 1B, the updated mapping information 124 identifies that data partition host 120 now processes access requests for data corresponding to keys 1-27, and also maintains a redirect instruction to redirect access requests for keys 28-33 to partition host 130 maintaining data partition 132. Data manager 150 may direct the copy of the portion of data 154 to data partition host 132 from source partition host 120 to destination partition host 130. In FIG. 1D, data manager 150 updates mapping information 156 at partition host 130 to indicate that the portion of data is now located at partition host 130, upon completion of the copy operation 154.

Figure 1E:
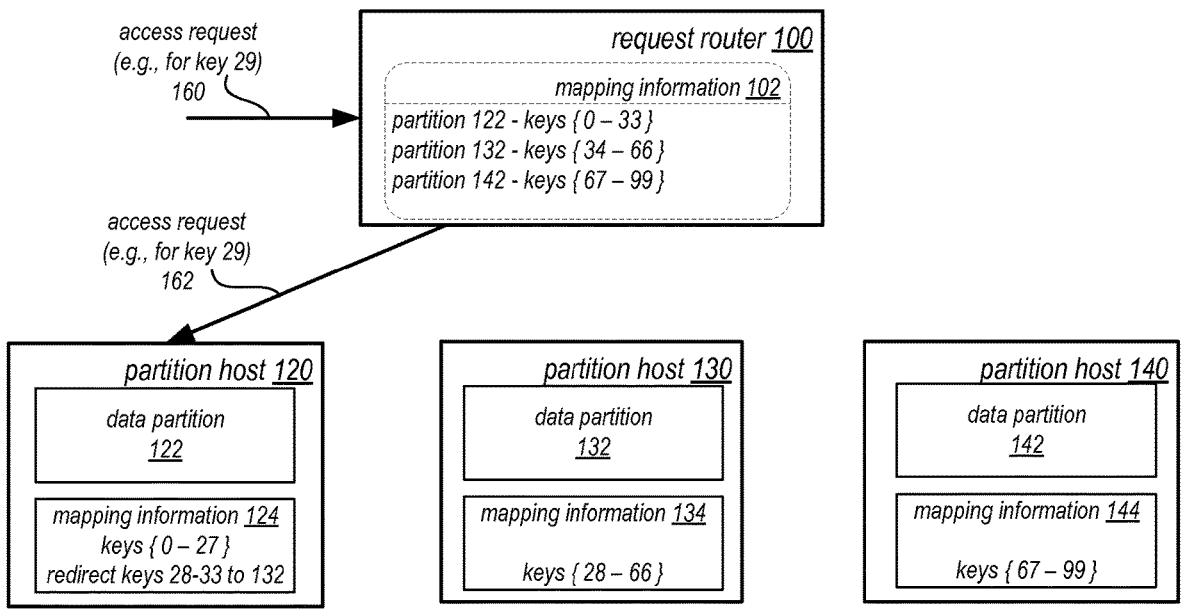
Figure 1F:
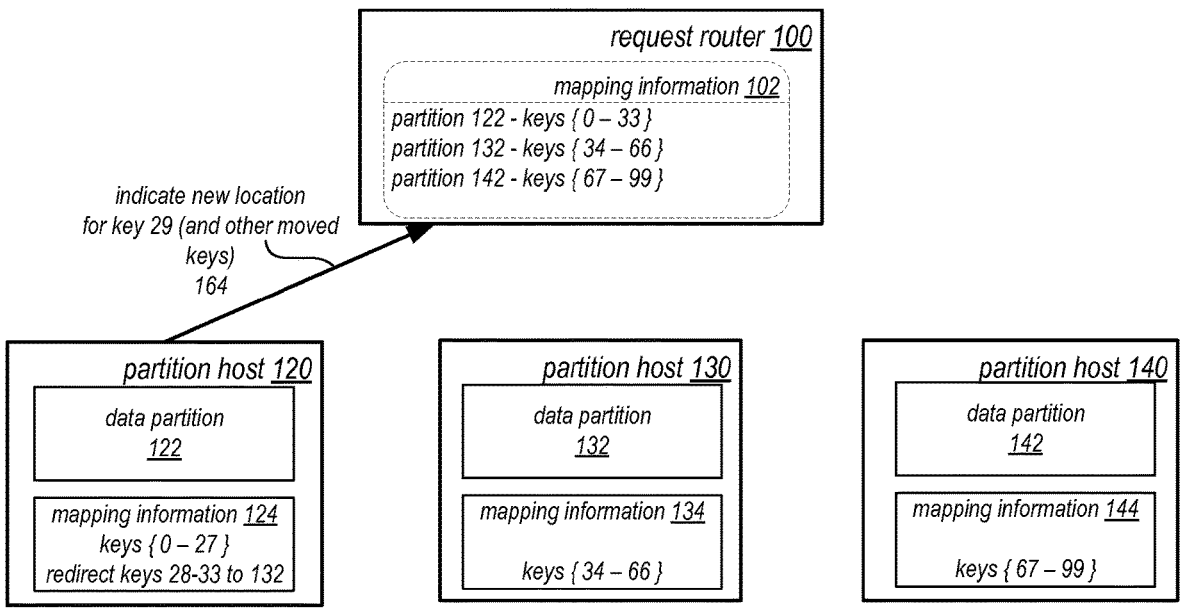
Figure 1G:
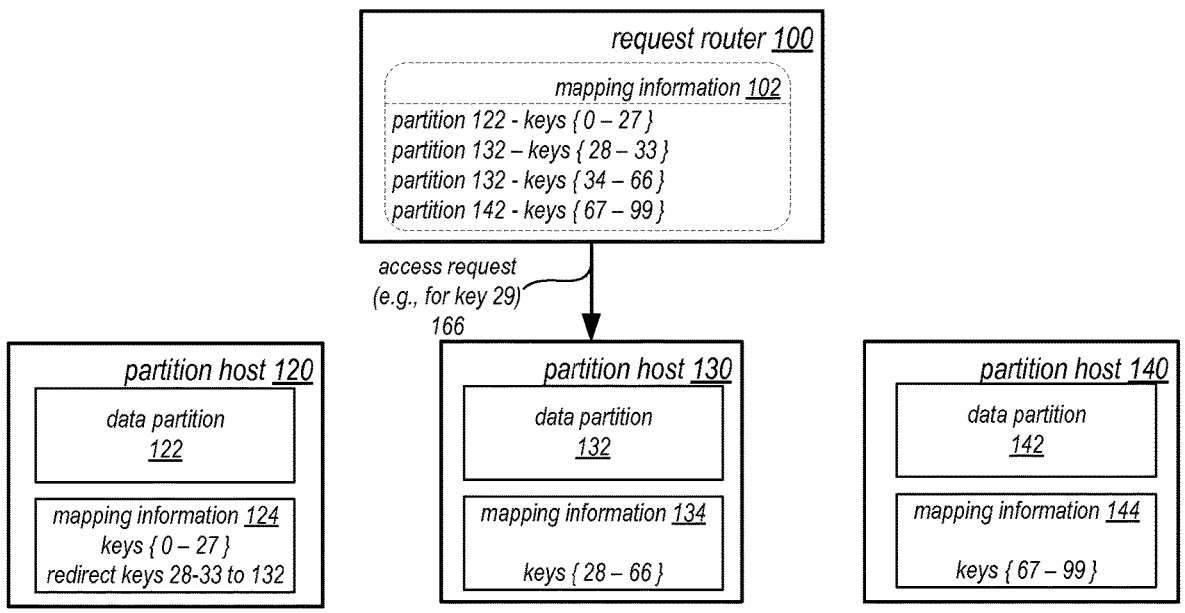
Figure 1H:
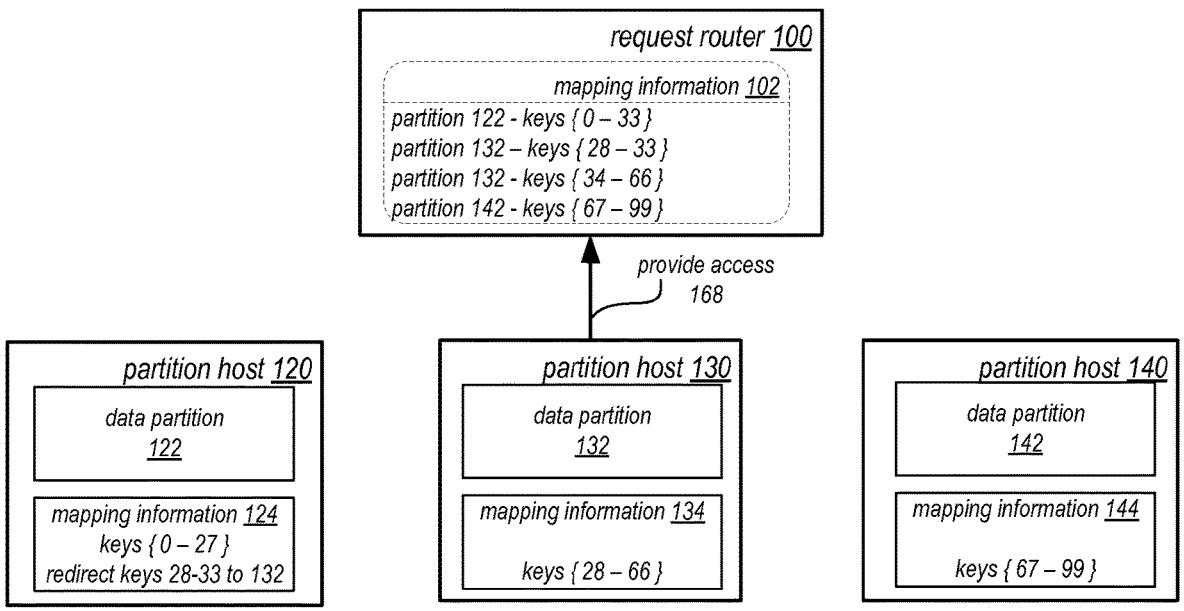

As of FIG. 1E, request router 100 is unaware of the changes to the location of data corresponding to keys 28-33. Mapping information 102 is not consistent with mapping information among the partition hosts 120, 130 and 140. However, request router 100 may discover and update changes to mapping information as needed. Even though request routers maintain the mapping information, mapping information inconsistencies, errors, or even total mapping information data loss may be corrected. Thus, request routers may perform stateless request routing without having to maintain state consistently, effectively performing stateless request routing, in various embodiments. For example, if access request 160 is received at request router 100 for key 29, request router 100 may determine that key 29 data is located at partition host 120 which maintains partition 122 according to mapping information 102. Thus, request router 100 may send access request 162 to partition host 120 for key 29 data. As illustrated in FIG. 1F, partition host may follow or perform a redirect instruction for keys 28-32, and respond 164 to the request indicating a new location for key 29, at data partition 132, along with new location information for the other keys 28-32 that have moved. As illustrated in FIG. 1G, request router 100 may update mapping information 102 to indicate that partition 132 maintains the portion of data corresponding to keys 28-33. Based on this information, request router 100 may send the access request 166 for key 29 to partition host 130. As partition host 130 maintains in mapping information n134 an indication that key 29 is within the range of maintained keys, then as illustrated in FIG. 1H partition host 130 may provide access 168 in response to the access request 166.

Please note that the previous example provides a logical illustration of dynamically data partitioning for stateless routing and is not intended to be limiting as to the number of partition hosts, requests, routers, data layout, and/or mapping information maintained.

The specification first describes an example of a distributed system, such as a distributed storage system that stores data for different storage clients. The distributed system may store data/maintain state for many different types of clients, in various embodiments. For example, one such client may be a database, or other application, system or service which partitions data amongst different partition hosts which may access the data partitions through one or more request routers. Included in the description of the example distributed system are various examples of distributed system systems or devices which may implement dynamic data partitioning for stateless request routing. The specification then describes a flowchart of various embodiments of methods for implementing dynamic data partitioning for stateless request routing. Next, the specification describes an example system that may implement the disclosed techniques. Various examples are provided throughout the specification.

Figure 2:
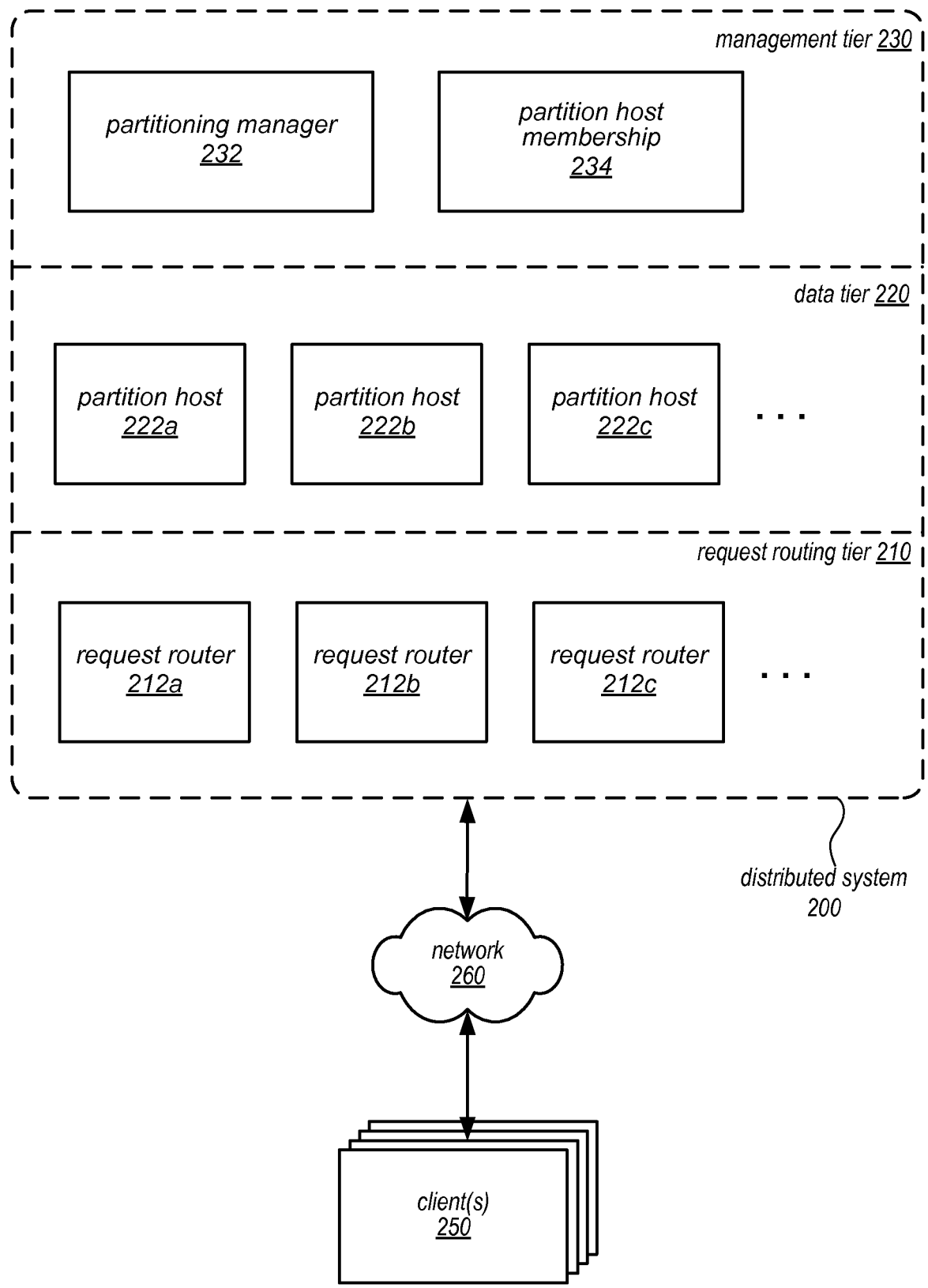
FIG. 2 is a block diagram illustrating a distributed system that implements dynamic data partitioning for stateless request routing to data maintained in the distributed system, according to some embodiments.

FIG. 2 is a block diagram illustrating a distributed system that implements dynamic data partitioning for stateless request routing to data maintained in the distributed system, according to some embodiments. Distributed system 200 may provide storage for data for a plurality of clients 250 in data tier 220 distributed across partition hosts 222a, 222b, 222c, and so on that may make up different groups of partition hosts storing different data for clients 250. For example data maintained in a partition group may be network address allocation information for a provider network service that includes distributed system 200, in some embodiments. Clients 250 may interact with distributed system 200 via a network 260. Clients 250 may be internal to distributed system 200 (e.g., as part of a provider network that includes distributed system 200 or other larger distributed system) or external to distributed system 200 (e.g., external to a provider network that includes distributed system 200). Access requests may be directed to request routing tier 210, which may include request routers 212a, 212b, 212c and so on, which may perform request routing to partition data without relying upon strongly consistent mapping information maintained in the request routing tier 210, effectively providing stateless request routing. Instead, request routers 212 may discover the location of requested data based on mapping information maintained at and obtained from partition hosts 222 in order to direct access requests from client 250 received via network 260 to the appropriate partition host. Management tier 230 may include partitioning manager 232 and partition host membership 234 to facilitate partitioning and repartitioning of data (e.g., moving data) among partition hosts 222. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 7 and described below. In various embodiments, the functionality of a given system component (e.g., a component of the distributed system) may be implemented by a particular node or may be distributed across several nodes. In some embodiments, a given node may implement the functionality of more than one system component (e.g., more than one storage system component).

In at least some embodiments, distributed system 200 may implement a distributed system control plane management tier 230 including partitioning manager 232 and partition host membership 234. Partitioning manager 232 may perform the various techniques described below with regard to FIGS. 3-6 to provide dynamic data partitioning of data for stateless request routing via request routing tier 210. For instance, in various embodiments, partition manager 232 may detect repartitioning events for data, select portions of data to move, select source and/or destination partition hosts 222, direct the updating of mapping information at partition hosts 222, direct the transfer or copying of data from partition host to partition host, and/or perform any other action to move portions of data among partition hosts 222 while maintaining mapping information in data tier 220 which may be used by request routing tier 210 to discover the location of particular portions of data. Partition host membership 234 may act as an authoritative source for partition hosts belong to a particular group of partition hosts that maintain data for a particular client. In some embodiments, partition host membership 234 may provision additional partition hosts to add to a group or remove partition hosts from a group. Request routers 212 may access or obtain partition host group membership from partition host membership 234 in various embodiments.

Distributed system 200 may, in various embodiments, implement data tier 220, including multiple partition hosts, such as partition hosts 222a, 222b, 222c, and so on, to provide distributed storage for storing data for clients 250. Different groups of partition hosts 222 may make up a set storage nodes that provide a distributed system for a particular client 250. In at least some embodiments, partition hosts 222 may store data for different clients as part of a multi-tenant storage service. Each partition host 222 may be configured to perform various operations to process access requests from clients 250 according to respective mapping information maintained at the partition host for the data, such as performing various reads, writes, gets, puts, and/or other modifications to data. For instance, a partition host 222 may only allow access (e.g., read or write access) to portions of the data that are indicated as maintained at the partition host 222 in the mapping information. Even if the requested data is physically located at the partition host 222, partition host 222 may deny the access request if the mapping information does not indicate that the data is residing at the partition host 222. Partition hosts 222 may have attached storage devices for persistent storage, such as hard disk drives, solid state drives, or various storage devices to store data partitions and mapping information. In some embodiments, partition hosts may provide volatile storage for caching or temporary storage for updates to a portion of data, such as log or history of changes to the portion of data for synchronization with a copy of the portion of the data at another partition host.

Distributed system 200 may implement request routing tier 210 which may implement multiple different request routers, such as request routers 212a, 212b, 212c, and so on, so that requests for data partition among partition hosts 222 may be routed to the appropriate partition host 222. Request routers may be implemented by one or more computing devices or servers, such as computing system 1000 described below with regard to FIG. 7. Request routers 212 may implement the various techniques described below with regard to FIG. 6 to direct requests to partition hosts and update mapping information maintained at request routers 212 (e.g., in system memory). Request routers 212a may be stateless, performing request routing without persistently maintaining any mapping information or other information to direct access requests, in some embodiments.

Clients 250 may encompass any type of client configurable to access data maintained for the client in distributed system 200. Clients 250 may be individual components, applications, or devices, or alternatively may be other distributed systems, such as a distributed database system that utilizes distributed system 200 to store data for databases managed at the distributed database system. Clients 250 may submit access requests to request routers 212 for access to data in data tier 220 according to an interface for distributed system 200, such as an application programming interface (API). For example, a given client 250 may format update requests to write data to particular portions of data according to a command line interface utilizing the API. Similarly, read requests may also be formatted according to the API. Responses and acknowledgments from the request routers 212 and partition hosts 222 may also be formatted according to the API. Clients 250 may encompass an application such as a database application (or user interface thereof), a media application, an office application or any other application that may make use of storage resources to store and/or access one or more stored data in distributed system 200. In some embodiments, such an application may include sufficient protocol support for generating and processing requests to the data according to the API.

Clients 250 may convey access requests to and receive responses/acknowledgments from request routers 212 via network 260. In various embodiments, network 260 may encompass any suitable combination of networking hardware and protocols necessary to establish network-based-based communications between clients 250 and distributed system 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and distributed system 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and distributed system 200. It is noted that in some embodiments, clients 250 may communicate with distributed system 200 using a private network rather than the public Internet. For example, clients 250 may be provisioned within the same enterprise as a distributed system (e.g., a system that implements both clients 250 and distributed system 200). In such a case, clients 250 may communicate with distributed system 200 entirely through a private network 260 (e.g., a LAN or WAN that may use Internet-based communication protocols but which is not publicly accessible).

Figure 3:
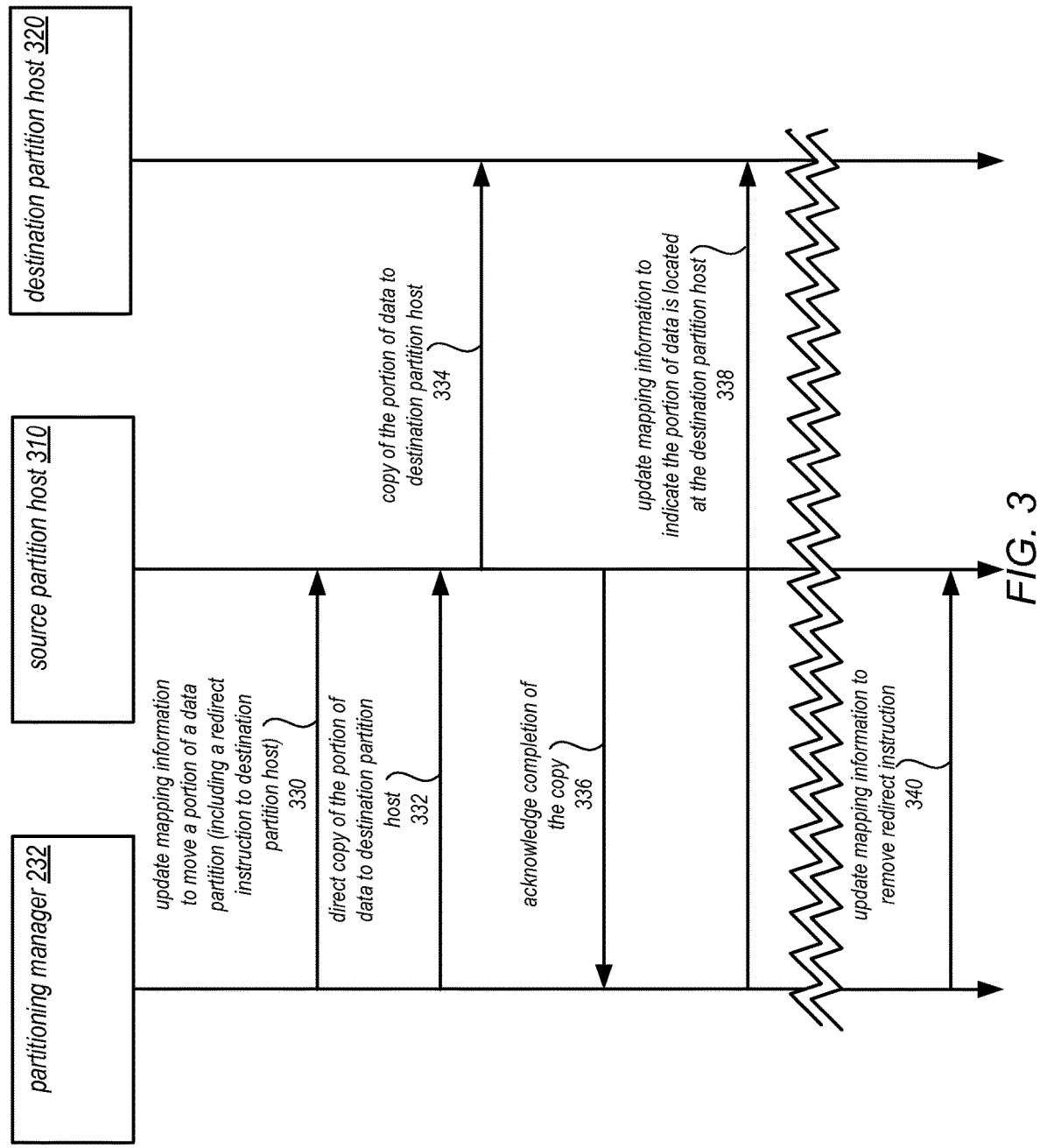
FIG. 3 is a sequence diagram illustrating the interactions among a partitioning manager, a source partition host, and a destination partition host, according to some embodiments.

FIG. 3 is a sequence diagram illustrating the interactions among a partitioning manager, a source partition host, and a destination partition host, according to some embodiments. A repartitioning event may be detected to move a portion of data from source partition host 310 to destination partition host 320. Partitioning manager 232 may communicate with source partition host 310 and/or destination partition host 320 according to one or more networking protocols (e.g., Hypertext Transfer Protocol (HTTP)), interfaces (e.g., programmatic (Application Programming Interface (API) or command line interface), or other communication techniques. Partitioning manger 232 may update (or direct the update) of mapping information 330 to indicate destination partition host 320 as the location of the portion of the data to be moved (e.g., including a redirect instruction to the destination partition host 320). Partitioning manager 232 may direct the copy of the portion of the data 332 to the destination partition host 320, in various embodiments. For example, the partitioning manager may issue an API command to source partition host 310 that begins a copy operation 334 from source partition host of the portion of the data to destination partition host 320. In some embodiments, partitioning manager 232 may obtain the portion of the data from source partition host 310 and directly transfer the data from partition manager 232 to destination partition host 320 (not illustrated). As illustrated in FIG. 3, an acknowledgement 336 of the completion of the copy may be received, in some embodiments. In response to the completion of the copy, partitioning manager 232 may update the mapping information 338 at destination partition host 320 to indicate that the portion of the data is located at the destination partition host 320. At some time after the update to the mapping information at destination partition host 320, partition manager 232 may remove the redirect instruction 340 from partitioning manager 232. Please note that the above diagram is provided as an example of dynamic data partitioning, and thus other orderings, such as the techniques discussed below with regard to FIG. 5 may be performed by partitioning manager as well.

Figure 4:
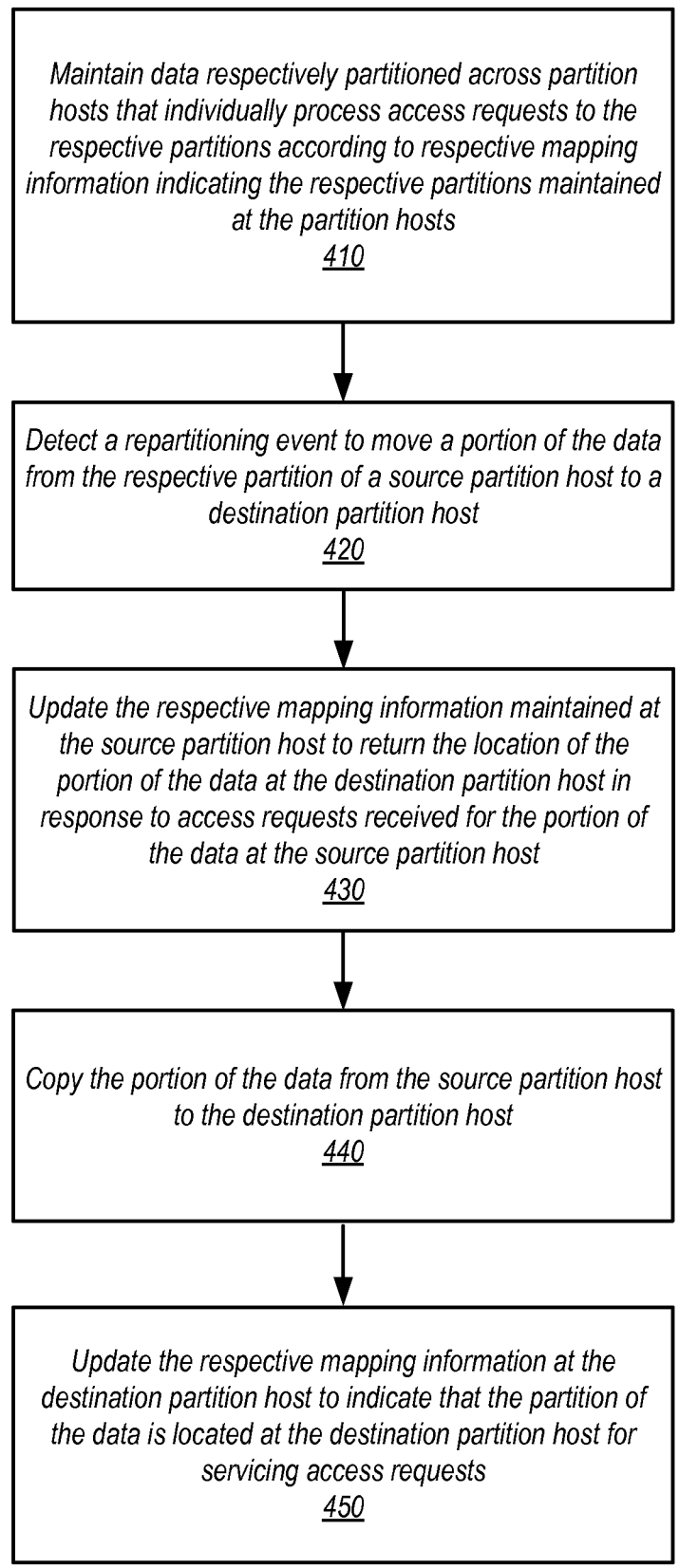
FIG. 4 is a high-level flowchart illustrating methods and techniques to implement dynamic data partitioning for stateless request routing, according to some embodiments.

The techniques described above with regard to FIGS. 1A-3 may be implemented for many diverse distributed systems which partition data among partition hosts. For example, a single copy of the data may be maintained at different partitions of the data at different partition hosts. While in other examples, multiple copies of data may be maintained at different partition hosts so that more than one partition host may provide access to portions of the data (e.g., in read-only systems without concurrency concerns). Therefore, the possibilities of dynamic data partitioning for stateless request routing are not limited to the examples given above. Moreover, although these examples are given with regard to a distributed system (e.g., distributed system 200 in FIG. 2), the previously described techniques are not limited to such systems. FIG. 4 is a high-level flowchart illustrating methods and techniques to implement dynamic data partitioning for stateless request routing, according to some embodiments.

As indicated at 410, data respectively partitioned across different partition hosts may be maintained. The data may be any size or type of data set which may be divided for partitioned access. Multiple copies of the same portion of data may be maintained at different partition hosts, providing redundant storage for the data. In at least some embodiments, the partition hosts maintaining a respective partition of the data may process access requests to the respective partition. Access requests may be any request to read, write, modify, get, put, obtain, or otherwise access a portion of the data. Partition hosts may also maintain mapping information which indicates the portions of data in a partition at a partition host. For example, in some embodiments, partition key ranges or other identifiers may be maintained as part of mapping information to identify the portions of data corresponding to the keys or identifiers maintained or stored at the partition host. In at least some embodiments, the same partition key may be maintained at multiple partition hosts (and thus the data corresponding to the partition key may be maintained the multiple partition hosts). If the mapping information does not indicate that the portion of data is located at the partition host, then the partition host may, in some embodiments, deny the access request.

As indicated at 420, a repartitioning event may be detected, in various embodiments, to move a portion of the data from the respective partition of a source partition host to a data partition host. For example, a repartitioning event may be triggered by an automated or dynamic partitioning mechanism that monitors various utilization and performance metrics of partition hosts. In one instance, the processing utilization or throughput utilization (e.g., Input/Output Operations per Second (IOPS)) of a partition host may be measured. If the measured utilization exceeds a utilization capacity or threshold, then a repartitioning event may be triggered to move a portion of data from the resource host that triggered the repartitioning event. In some embodiments, the repartitioning even may be triggered by current data storage utilization exceeding a storage capacity threshold. A request to repartition or move a certain portion of data or identify a certain partition host may be received, in some embodiments. For example, a change to the software and/or hardware underlying a partition host may be made, and requests to repartition or move data to the new partition host may be made in order to test the functionality of the new partition host. Various other reasons for requests to repartition may exist, whether automatically determined by another system, service, or device, or via manual input according to a user interface (e.g., command line or graphical user interface). Once the repartitioning event is detected, the portion of data to be moved may be determined, in some embodiments. For example, a portion of data that is causing a partition to exceed a utilization or capacity threshold may be identified for movement.

In response to detecting the repartitioning event, the respective mapping information maintained at the source partition host may be updated to return the location of the portion of the data at the destination partition host in response to access requests received for the portion of the data at the source partition host, as indicated at 430, in various embodiments. For example, a redirect instruction or other record may be recorded or stored at the source partition host, which may direct the host to return access requests for the portion of the data to a requestor (e.g., a request router such as discussed below with regard to FIG. 6) indicating the new location of the portion of the data. For example, an HTTP 302 Found response, or other redirection response, may be sent from the source partition host to requests received at the source partition host for the portion of the data. In at least some embodiments, the partition keys or other mapping information identifying the portion of the data may be removed from the source partition host.

As indicated at 440, the portion of the data may be copied from the source partition host to the destination partition host, in various embodiments. For example, various File Transfer Protocols (FTPs), data transfer protocols, encryption, compression, or any other transmission techniques may be implemented to copy the portion of the data from the source partition host to the destination partition host. Upon completion of the copy of the portion of the data, the respective mapping information at the destination partition host may be updated to indicate that the partition of the data is located at the destination partition host and is available for processing access requests. For instance, the partition keys or identifiers of the portion of the data may be added to the mapping information.

The techniques described above with regard to FIG. 4 may be repeatedly performed to dynamically repartition data across partitioning hosts, for various reasons, as frequently as desired. As the mapping information is maintained at the different partition hosts, any request routers or other systems, components, or devices attempting access data may discover the changes in data location as needed. For example, the same portion of data could move multiple times, and a request router following the new location responses would eventually discover a current location for the portion of the data. In at least some embodiments, a redirect instruction may be removed or reclaimed from a source partition host subsequent to the update of mapping information at the destination partition host. For example, the redirect may be retained until a refresh window for mapping information of request routers has passed (which provides a period of time during which each request router may ask for an update of mapping information from the partition hosts) so that every request router can discover the change in data location. In addition to repartitioning data amongst current partition hosts, the previous techniques may be performed to move data to a new partition host added to the group of partition hosts maintaining data, or conversely to remove data from a partition host that is to be removed from a the group of partition hosts maintaining the data. Partition host group changes, as discussed above with regard to FIG. 2, may be recorded in an authoritative data store, which may be consistently maintained. This authoritative data store may be access by request routers occasionally to learn, confirm, or otherwise discover active partition hosts in a group of partition hosts.

Figure 5:
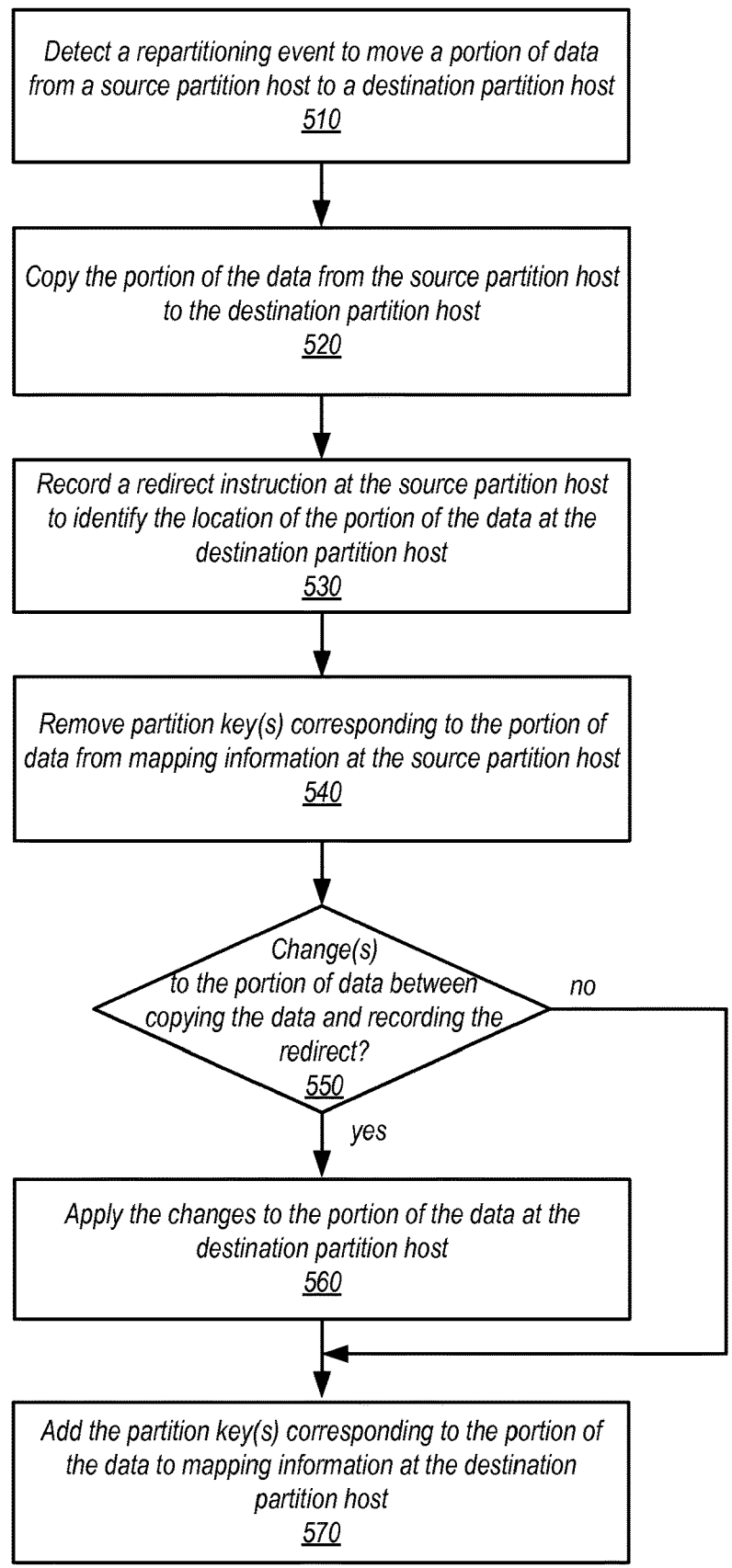
FIG. 5 is a high-level flowchart illustrating methods and techniques to implement updating mapping information and copying data between source partition hosts and destination partition hosts, according to some embodiments.

Dynamic data partitioning allows for various implementations of updating mapping information and moving data amongst partition hosts. In some embodiments, such as the example discussed above with regard to FIGS. 1A-1H and 4, requests for portions of data may be directed to a destination partition host before a partition host has completely received the portion of the data from the source partition host. In such a scenario, the access requests sent to the destination partition host may fail or timeout until copying is complete. Thus, alternative orderings or techniques may be implemented to minimize client access impact to data that is being moved. FIG. 5 is a high-level flowchart illustrating methods and techniques to implement updating mapping information and copying data between source partition hosts and destination partition hosts, according to some embodiments.

As indicated at 510, a repartitioning event may be detected to move a portion of data from a source partition host to a destination partition host, in some embodiments. In response to detecting the repartitioning event, the portion of the data to be moved may begin copying or transferring from the source partition host to the destination partition host, as indicated at 520 (according to one of the various techniques described above with regard to FIG. 4). During the copying of the portion of the data, the source partition host may continue to process access requests to the portion of data. In some embodiments, the source partition host may lock the portion of the data as read-only, while in other embodiments, changes to the portion of the data may continue to be applied. Upon completion of the copy, a redirect instruction may be recorded as part of the mapping information at the source partition host in order to identify the location of the portion of the data at the destination partition host, as indicated at 530, in some embodiments. For example, a number or range of keys or identifiers of data may be indicated as redirected to the destination partition host. In this way, the source partition host may no longer process access requests to the portion of the data. As indicated at 540, partition key(s) corresponding to the portion of the data may be removed from the mapping information at the source partition host, in at least some embodiments.

During the time between the completion of the copy, element 520, and the recordation of the redirect instruction, element 530, one or more changes to the portion of the data may be received as access requests at the source partition host and applied to the portion of the data, in some embodiments. For example, a particular data value may be overwritten or incremented. The portion of the data as it exists in the destination partition host does not reflect these changes. Thus, if changes to the portion of the data between copying the data and recording the redirect exist, as indicated by the positive exit from 550, then the changes may be applied to the portion of the data the destination partition, as indicated at 560, in some embodiments. For example, a change log or other history of changes to the portion of data may be maintained for the interval between completion of the copy operation and the recording of the redirect instruction. The change log or history may be replayed to update the portion of the data that is maintained in the destination partition host, in some embodiments. Various other synchronization techniques may be used to apply the changes to the portion of the data at the destination partition host, and thus the previous example is not intended to be limiting. Once the changes are applied (or as indicated by the negative exit from element 550 no changes are applied), the partition key(s) corresponding to the portion of the data may be added to the mapping information maintained at the destination partition host, as indicated at 570, in some embodiments. In this way, a synchronized version of the portion of the data may be made available when the partition keys of the mapping information indicate that the destination partition node now process access requests to the portion of the data.

Figure 6:
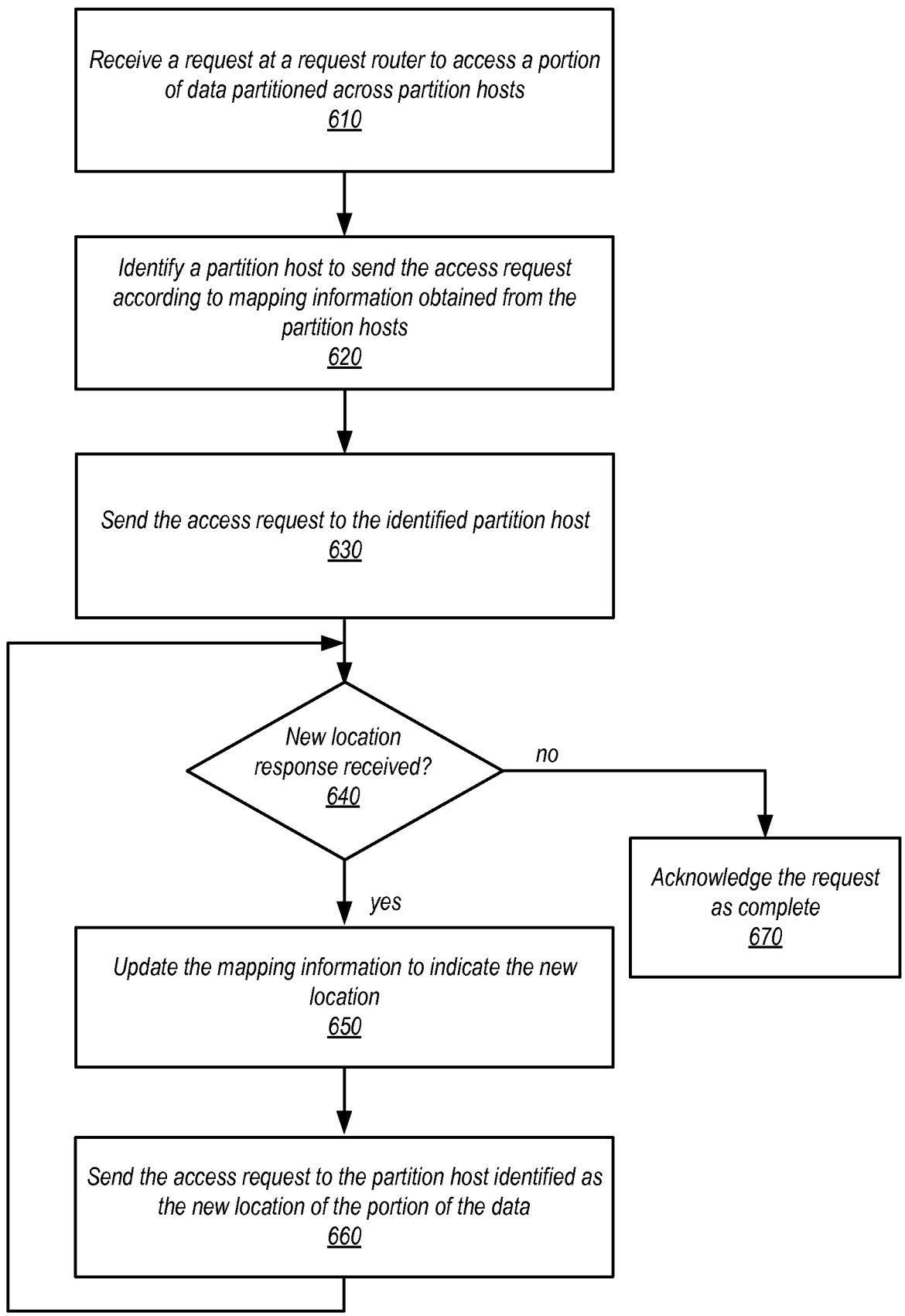
FIG. 6 is a high-level flowchart illustrating methods and techniques for processing access requests at stateless request routers, according to some embodiments.

As noted above, request routers may direct access requests to partition hosts based on mapping information obtained from the partition hosts. In this way, the request routers can direct access requests without a requirement that the request router maintain a current or consistent view of the locations of data among the partition hosts. For example, in a scenario where multiple routers are directing requests to partitions of data among different partition hosts, some request routers may have a different view or understanding of the location of data (as the request router may have discovered repartitioning of data before other request routers). In this way, request routers may discover repartitioning of data without relying upon access to a centralized repository of mapping information, but may incrementally update the mapping information used at a particular request router as needed. FIG. 6 is a high-level flowchart illustrating methods and techniques for processing access requests at stateless request routers, according to some embodiments.

As indicated at 610, a request to access a portion of data partitioned across different partition hosts may be received at a request router. For example, a read or write request may be received to obtain or modify a portion of the data. The access request may, in various embodiments, indicate the particular portion of data to be accessed based on a partition key or other identifier which may be used to indicate the desired portion of data.

In response to receiving the access request, a partition host to send the access request may be identified according to mapping information obtained from the different partition hosts, as indicated at 620, in some embodiments. For example, in at least some embodiments, a request router may periodically (or aperiodically) query the partition hosts identified as maintaining the data for updated mapping information. Mapping information may also be updated according to previously received new location responses, as discussed below. The mapping information may, for instance, map partition keys to one or multiple partition hosts which maintain a partition of the data that includes the portion of the data corresponding to the included partition key or identifier of the access request. In various embodiments, mapping information may not be persistently be maintained, but instead may be maintained in volatile and/or transitory memory (e.g., system memory). If a request router fails or restarts, the request router may obtain the list of partition hosts and request mapping information from the partition hosts. Once identified, the access request may be sent to the identified partition host, as indicated at 630. For example, the particular write, read, get, put, or other type of request may be sent to the particular partition host. The access request may, in some embodiments, be translated or transformed from one type of request to another (e.g., converting a request from one API format to another API format or protocol). In at least some embodiments, the access request may be sent to an identified partition host according to Hypertext Transfer Protocol (HTTP).

A response may not be received, and the request retried according to some timeout window or threshold. In various embodiments, a response to the access request may be received from the identified partition host. If the response indicates that the access request was successful (e.g., returning the appropriate data or acknowledgment), then as indicated by the negative exit from 640, the request router may acknowledge the request to a client as complete, as indicated at 670. For example, the request router may re-translate or re-transform the acknowledgement according to a same protocol, format, or API in which the original request was received. If, however, as indicated by the positive exit from 640, a response is received at the request router indicating a new location for the portion of the data, then the mapping information at the request router may be updated to indicate the new location, as indicated at 650. For example, an HTTP 302 FOUND response may be returned indicating the partition host that currently stores the requested portion of data. In some embodiments, the new location may include a range of partition keys, or other identifiers of mapping information which may be used to update the mapping information at the request router (as discussed above with regard to FIGS. 1F and 1G). The access request may then be resent to the partition host identified as the new location of the portion of the data, as indicated at 660, in various embodiments. Similar to the discussion above, the request may timeout or receive no answer, and the access request may be resent. For instance, as discussed above with regard to FIGS. 4 and 5, in some embodiments, the copying of the portion of the data to the destination partition host may not yet be complete, and therefore the identified partition host may be unable process the access request. However, as indicated by the return arrow to element 640 if a response that is not a new location response is received then the request may be acknowledged as complete. Please note, that in some embodiments a complete response does not indicate that the access request was successful as partition hosts may implement various concurrency schemes, such as locking mechanisms, in scenarios where multiple readers and/or writers may access the portion of data. Therefore, the previous example is not intended to be limiting as to the type of successful response to an access request.

The methods described herein may in various embodiments be implemented by any combination of hardware and software. For example, in one embodiment, the methods may be implemented by a computer system (e.g., a computer system as in FIG. 7) that includes one or more processors executing program instructions stored on a computer-readable storage medium coupled to the processors. The program instructions may be configured to implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 7:
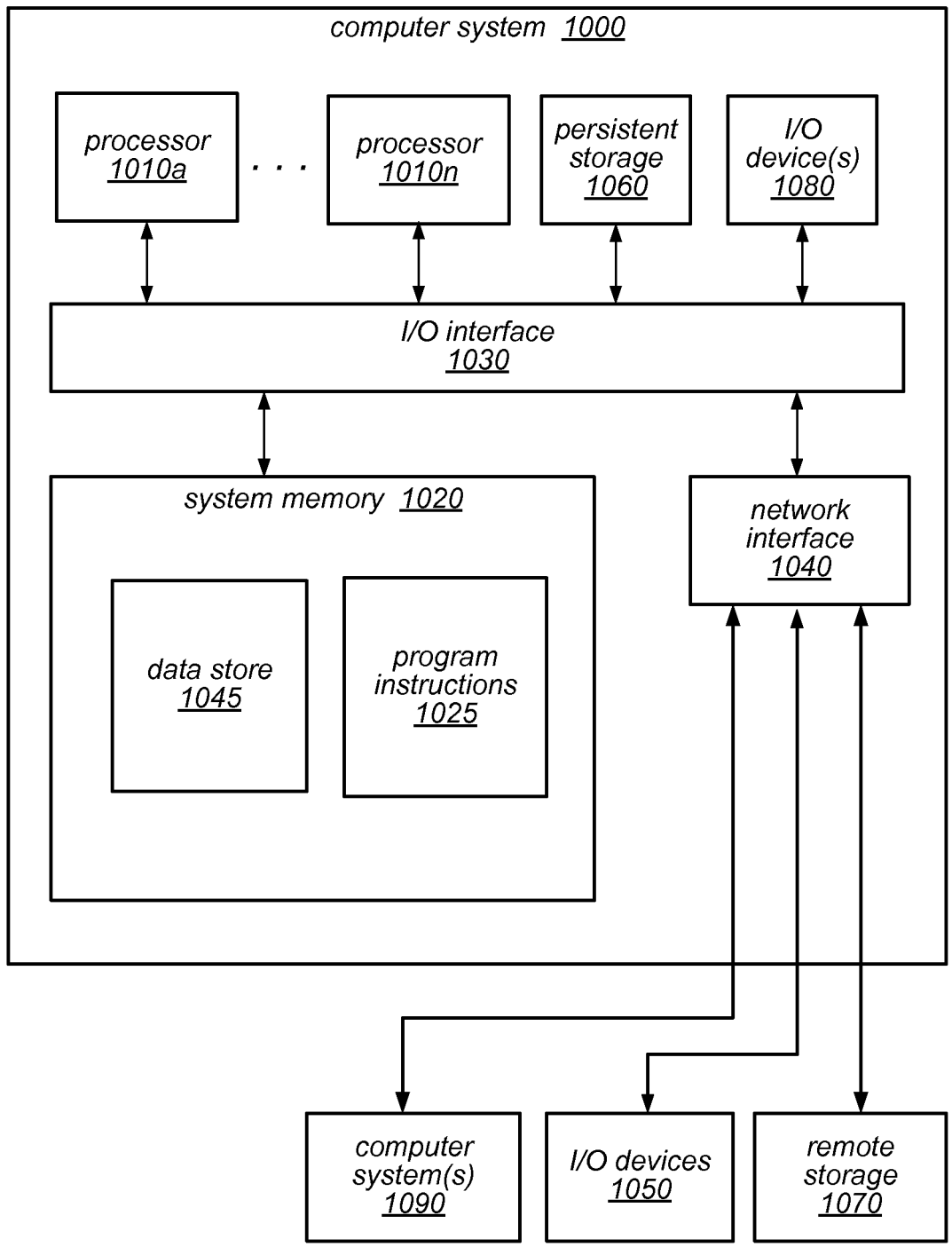
FIG. 7 is an example computer system, according to various embodiments.

FIG. 7 is a block diagram illustrating a computer system configured to implement at least a portion of the various nodes, systems, or components of the distributed systems, such as the example distributed system described herein, according to various embodiments. For example, computer system 1000 may be configured to implement various storage nodes of a distributed storage system that stores data on behalf of clients, in different embodiments, or more generally implement any of the various types of nodes or components that may be implemented as part of a distributed system. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the database systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a distributed system node or client of a distributed system. In some embodiments, program instructions 1025 may implement multiple separate clients, nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. For example, the information described herein as being stored by the storage system described herein may be stored in data store 1045 or in another portion of system memory 1020 on one or more nodes, in persistent storage 1060, and/or on one or more remote storage devices 1070, at different times and in various embodiments. Similarly, the information described herein as being stored by the storage system may be stored in another portion of system memory 1020 on one or more nodes, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, database configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 7 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, the distributed storage systems described herein may be offered to clients as a network-based service. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
  a distributed data store comprising a plurality of different partition hosts implemented on a plurality of different computing nodes, the plurality of different partition hosts configured to:
    each maintain respective mapping information indicating respective partitions of data maintained at the plurality of different partition hosts, and
    process access requests for the respective partitions of the data maintained across the plurality of different partition hosts according to the respective mapping information;
  one or more computing nodes implementing a data manager, the data manager configured to:
    detect a repartitioning event to move a portion of the data from a respective partition of a source partition host to a destination partition host;
    in response to the detection of the repartitioning event:
      update the respective mapping information maintained at the source partition host to indicate that the portion of the data is located at the destination partition host such that subsequent access requests for the portion of the data received at the source partition host are returned to a requestor indicating the destination partition host as the location to send access requests for the portion of the data;
      copy the portion of the data from the source partition host to the destination partition host; and upon completion of the copy of the portion of the data, update the respective mapping information maintained at the destination partition host to indicate that the portion of the data is located at the destination partition host such that the portion of the data is available for subsequent access requests received at the destination partition host.

2. The system of claim 1, further comprising:
a request router, configured to:
   send an access request for the portion of the data to the source partition host, wherein the source partition host is identified as maintaining the portion of the data according to the respective mapping information obtained from the source partition host at the request router prior to the updating of the respective mapping information at the source partition host;
   receive a response from the source partition host indicating that the portion of the data is located at the destination partition host;
   in response to the receipt of the response from the source partition host:
   update the respective mapping information at the request router; and
   send the access request to the destination partition host.

3. The system of claim 2, wherein the request router is further configured to:
   prior to the send of the access request:
      obtain respective locations of the plurality of partition hosts; and
      request the respective mapping information from the plurality of partition hosts.

4. The system of claim 1, wherein to detect the repartitioning event to move the portion of the data from the respective partition of the source partition host of the plurality of partition hosts to be included in the respective partition of the destination partition host of the plurality of partition hosts, the data manager is configured to:
   receive a request to move the portion of the data from the source partition host to the destination partition host.

5. A method, comprising:
   maintaining, by one or more computing devices, data respectively partitioned across a plurality of partition hosts, wherein the plurality of partition hosts individually process access requests to the respective partitions of the data according to respective mapping information maintained at the partition hosts indicating the respective partitions of the data maintained at the plurality of partition hosts;
   in response to a repartitioning event:
      updating, by the one or more computing devices, the respective mapping information maintained at a source partition host to indicate that a portion of the data is located at a destination partition host such that subsequent access requests for the portion of the data received at the source partition host are returned to a requestor indicating the destination partition host as the location to send access requests for the portion of the data; and
      upon completion of copying the portion of the data, updating, by the one or more computing devices, the respective mapping information maintained at the destination partition host to indicate that the portion of the data is located at the destination partition host such that the portion of the data is available for subsequent access requests received at the destination partition host.

6. The method of claim 5, further comprising:
   sending, by a request router, an access request for the portion of the data to the source partition host, wherein the source partition host is identified as maintaining the portion of the data according to the respective mapping information obtained from the source partition host at the request router prior to the updating of the respective mapping information at the source partition host;
   receiving, by the request router, a response from the source partition host indicating that the portion of the data is located at the destination partition host;
   in response to receiving the response from the source partition host:
      updating, by the request router, the respective mapping information at the request router; and
      sending, by the request router, the access request to the destination partition host.

7. The method of claim 6, further comprising:
   prior, by the request router, to sending the access request, obtaining respective locations of the plurality of partition hosts.

8. The method of claim 7, further comprising:
   prior, by the request router, to sending the access request, requesting the respective mapping information from the plurality of partition hosts.

9. The method of claim 5, wherein portions of the data including the portion of the data are identified according to respective partition keys, and wherein the data is respectively partitioned among the plurality of partition hosts according to a hash function applied to the respective partition keys for the portions of the data, wherein the respective mapping information of the plurality of resource hosts indicates the respective partition keys of the portions of the data included in the respective partitions maintained at the plurality of resource hosts.

10. The method of claim 9, further comprising:
   wherein updating the respective mapping information maintained at the source partition host to indicate that the portion of the data is located at the destination partition host comprises:
      removing, by the one or more computing devices, one or more partition keys corresponding to the portion of the data from the respective mapping information at the source partition host; and
      recording, by the one or more computing devices, a redirect instruction at the source partition host to identify the location of the portion of the data as the destination partition host;
   wherein updating the respective mapping information maintained at the destination partition host to indicate that the portion of the data is located at the destination partition host comprises:
      adding, by the one or more computing devices, the one or more partition keys corresponding to the portion of the data at the destination partition host;
   subsequent to updating the respective mapping information maintained at the destination partition host to indicate that the portion of the data is located at the destination partition host, removing, by the one or more computing devices, the redirect instruction from the respective mapping information at the source partition host.

11. The method of claim 5, wherein the repartitioning event is detected according to a determination that storage utilization at the source partition host exceeds a storage capacity threshold.

12. The method of claim 5, further comprising:
wherein updating the respective mapping information maintained at the source partition host to indicate that the portion of the data is located at the destination partition host is performed upon completion of the copying of the portion of the data;
wherein at least one change to the portion of the data is processed at the source partition host between the completion of the copying and the updating the respective mapping information maintained at the source partition host; and
prior to performing updating the respective mapping information maintained at the destination partition host to indicate that the portion of the data is located at the destination partition host, applying, by the one or more computing devices, the at least one change to the portion of the data at the destination partition host.

13. The method of claim 5, wherein another partition host is added to the plurality of partition hosts, wherein the updating the respective mapping information maintained at the source partition host and the updating the respective mapping information maintained at the destination partition host are performed to relocate one or more portions of the data from the plurality of partition hosts to the other partition host.

14. A non-transitory, computer-readable storage medium, storing program instructions that when executed by a plurality of computing devices cause the plurality of computing devices to implement:
maintaining data respectively partitioned across a plurality of partition hosts, wherein the plurality of partition hosts individually process access requests to the respective partitions of the data according to respective mapping information maintained at the partition hosts indicating the respective partitions of the data maintained at the plurality of partition hosts;
in response to a repartitioning event:
updating the respective mapping information maintained at a source partition host to indicate that a portion of the data is located at a destination partition host such that subsequent access requests for the portion of the data received at the source partition host are returned to a requestor indicating the destination partition host as the location to send access requests for the portion of the data; and
upon completion of copying the portion of the data, updating mapping information maintained at the destination partition host to indicate that the portion of the data is located at the destination partition host such that the portion of the data is available for subsequent access requests received at the destination partition host.

15. The non-transitory, computer-readable storage medium of claim 14, wherein the updating the respective mapping information maintained at the source partition host and the updating the respective mapping information maintained at the destination partition host are directed by a data manager for the data, and wherein the program instructions when executed by the plurality of computing devices cause the plurality of computing devices to further implement:
sending, from a request router, an access request for the portion of the data to the source partition host, wherein the source partition host is identified as maintaining the portion of the data according to the respective mapping information obtained from the source partition host at the request router prior to the updating of the respective mapping information at the source partition host;
receiving, at the request router, a response from the source partition host indicating that the portion of the data is located at the destination partition host;
in response to receiving the response from the source partition host:
updating the respective mapping information at the request router; and
sending, from the request router, the access request to the destination partition host.

16. The non-transitory, computer-readable storage medium of claim 14, wherein the repartitioning event is a determination that processing utilization at the source partition host exceeds a throughput capacity threshold.

17. The non-transitory, computer-readable storage medium of claim 14, wherein the program instructions when executed by the plurality of computing devices cause the plurality of computing devices to implement:
wherein updating the respective mapping information maintained at the source partition host to indicate that the portion of the data is located at the destination partition host is performed upon completion of the copying of the portion of the data;
wherein at least one change to the portion of the data is processed at the source partition host between the completion of the copying and the updating the respective mapping information maintained at the source partition host; and
prior to performing updating the respective mapping information maintained at the destination partition host to indicate that the portion of the data is located at the destination partition host, applying the at least one change to the portion of the data at the destination partition host.

18. The non-transitory, computer-readable storage medium of claim 14, wherein the source partition host is identified for removal from the plurality of partition hosts such that the updating the respective mapping information maintained at the source partition host and the updating the respective mapping information maintained at the destination partition host are performed at least once to relocate the respective partition of the data maintained at the source partition host amongst remaining partition hosts of the plurality of partition hosts.

19. The non-transitory, computer-readable storage medium of claim 14, wherein portions of the data including the portion of the data are identified according to respective partition keys, and wherein the data is respectively partitioned among the plurality of partition hosts according to the respective partition keys for the portions of the data, wherein the respective mapping information of the plurality of resource hosts indicates the respective partition keys of the portions of the data included in the respective partitions maintained at the plurality of resource hosts, and wherein a same respective partition key is indicated in the respective mapping information at more than one of the plurality of resource hosts.

20. The non-transitory, computer-readable storage medium of claim 14, wherein the data is network address allocation information for computing resources implemented as part of a provider network, and wherein access requests to the data are performed as part of configuring the computing resources for one or more clients of the provider network.

* * * * *